United States Patent
Dar Juan et al.

(10) Patent No.: US 10,349,501 B1
(45) Date of Patent: Jul. 9, 2019

(54) SYSTEM AND METHODS FOR LOCATING AN ASSET IN AN ENVIRONMENT

(71) Applicant: Lexmark International, Inc., Lexington, KY (US)

(72) Inventors: Darliza Canonigo Dar Juan, Cebu (PH); Brennan Eul Inobio Mercado, Cagayan de Oro (PH)

(73) Assignee: Lexmark International, Inc., Lexington, KY (US)

(*) Notice: Subject to any disclaimer, the term of this patent is extended or adjusted under 35 U.S.C. 154(b) by 0 days.

(21) Appl. No.: 16/050,675

(22) Filed: Jul. 31, 2018

(51) Int. Cl.
*H04W 4/70* (2018.01)
*H05B 37/02* (2006.01)
*H04W 4/029* (2018.01)

(52) U.S. Cl.
CPC ........ *H05B 37/0272* (2013.01); *H04W 4/029* (2018.02); *H04W 4/70* (2018.02)

(58) Field of Classification Search
CPC ..... H05B 37/0272; H04W 4/70; H04W 4/029
USPC .................................................... 340/539.11
See application file for complete search history.

(56) References Cited

U.S. PATENT DOCUMENTS

| | | | | |
|---|---|---|---|---|
| 2013/0109406 | A1* | 5/2013 | Meador | H04L 67/125 455/456.1 |
| 2014/0341588 | A1* | 11/2014 | Pederson | H04B 10/40 398/128 |
| 2015/0147067 | A1* | 5/2015 | Ryan | H04B 10/116 398/118 |
| 2017/0354018 | A1* | 12/2017 | Kuenzler | H05B 37/0272 |
| 2017/0364348 | A1* | 12/2017 | Klitenik | H04L 12/2814 |
| 2018/0098407 | A1* | 4/2018 | Kazanchian | H05B 37/0227 |
| 2018/0115435 | A1* | 4/2018 | George | G05B 19/0426 |

* cited by examiner

*Primary Examiner* — Steven Lim
*Assistant Examiner* — Kam Wan Ma (57) ABSTRACT

A system for locating an asset in an environment with a plurality of lighting fixtures forming a network of sensors within the environment for detecting assets in the environment. Each lighting fixture includes a transceiver for receiving from an external device identifier information associated with the asset to be tracked and for receiving an acknowledgement from the asset when the asset responds to a query message from the lighting fixture. The identifier information is communicated over the network from one lightning fixture to another until a last lighting fixture receives the acknowledgement from the asset. A first lighting fixture that first receives the identifier information from the external device to the last lighting fixture that received the acknowledgement from the asset are illuminated such that a path of light is formed from a location of the external device to the asset.

19 Claims, 6 Drawing Sheets

SYSTEM AND METHODS FOR LOCATING AN ASSET IN AN ENVIRONMENT

CROSS REFERENCES TO RELATED APPLICATIONS

None

STATEMENT REGARDING FEDERALLY SPONSORED RESEARCH OR DEVELOPMENT

None.

REFERENCE TO SEQUENTIAL LISTING, ETC.

None.

BACKGROUND

1. Technical Field

The present invention relates generally to one or more methods and a system for locating an asset or a device in an environment. In particular, the disclosure relates to an indoor location system using lighting fixtures installed in a location to search and locate a device.

2. Description of the Related Art

There has always been a long-standing need to keep track of assets in an indoor or outdoor type of environment. For outdoor environments, standard GPS positioning may be used to communicate a geographical or physical location of an asset to a user. However, GPS signals lose significant power when passing through construction materials which makes GPS unsuitable for use in indoor areas. As such, using GPS can be an unreliable tracking method when used in an indoor environment or when the GPS satellite signals are obscured such as in a building, warehouse, or an indoor parking lot.

Other solutions for tracking units in an indoor or outdoor environment may also be used such as, for example, using sensors or other wired systems. However, these solutions may be costly and complex with the need to install separate devices suitable for tracking purposes. As the number of assets to track increases, and as the environment where the asset needs to be tracked becomes larger, the more complex and costly these existing systems need to be. As such, there is a need for an improved localization system and methods for tracking an asset in an environment that utilizes existing devices to locate the assets in the area.

SUMMARY

Embodiments of the present disclosure provide systems and methods for locating an asset in an environment with one or more installed lighting fixtures and providing a path of light using one or more of the lighting fixtures to guide a user to the asset.

A system for locating an asset in an environment according to one example embodiment includes a plurality of lighting fixtures forming a network of sensors within the environment for detecting assets in the environment. Each lighting fixture includes a transceiver for receiving from an external device identifier information associated with the asset to be tracked and for receiving an acknowledgement from the asset when the asset responds to a query message from the lighting fixture. The identifier information is communicated over the network from one lightning fixture to another until a last lighting fixture receives the acknowledgement from the asset. A first lighting fixture that first receives the identifier information from the external device to the last lighting fixture that received the acknowledgement from the asset are illuminated such that a path of light is formed from a location of the external device to the asset.

A localization system for determining location of an asset according to another example embodiment includes a user device for providing identifier information associated with the asset to be tracked. A plurality of lighting fixtures is distributed within an environment to form a network of sensors for detecting the presence of assets in the environment. Each lighting fixture is operative to communicate with the user device and the assets at a first frequency, and the lighting fixtures are operative to communicate with each other at a second frequency. In response to the user device providing the identifier information at the first frequency, the plurality of lighting fixtures communicate the identifier information over the network at the second frequency from a first lighting fixture that first receives the identifier information from the user device to a last lighting fixture that detects the presence of the asset to be tracked. The first lighting fixture to the last lighting fixture are illuminated to form a path of light from a location of the user device to the asset.

In a location system including a plurality of lighting fixtures forming a network of sensors in an environment for detecting assets in the environment, a method for determining a location of an asset in the environment according to another example embodiment includes receiving, at a first lighting fixture of the plurality of lighting fixtures, identifier information associated with the asset to be tracked from a user device. The first lighting fixture communicates the identifier information over the network. Each lighting fixture that receives the identifier information uses the identifier information to detect whether the asset is within range of the lighting fixture. The identifier information is passed from one lighting fixture to another until a last lighting fixture receives an acknowledgement from the asset. The method further includes illuminating the lighting fixtures that received the identifier information from the first lighting fixture to the last lighting fixture to form a path of light from a location of the user device to the asset.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

DETAILED DESCRIPTION OF THE DRAWINGS

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Disclosed are system and methods for tracking an asset located in an area such as, for example, an indoor environment with one or more lighting fixtures installed. A user may broadcast a message that initiates a search for the asset. A first lighting fixture nearest the user may receive the message and broadcast the message to search for the asset. If no acknowledgement is received, indicating that the asset is not within close proximity to the first lighting fixture, the first lighting fixture may pass the message to one or more nearby fixtures which, in turn, also broadcasts the message and waits for an acknowledgement response from the asset. As the message is passed along multiple lighting fixtures, the message may be appended with IDs of the fixtures that received the message. When a lighting fixture that is closest to the asset receives and broadcasts the message, the closest lighting fixture may receive the acknowledgement response from the asset, indicating that the asset is found. The closest lighting fixture then initiates a method for forming a path from the location of the asset to the location of the user searching for the asset. The path may be formed by turning on the lamps of the lighting fixtures that have received and passed on the message from the first lighting fixture to the closest lighting fixture, as indicated in the message where the IDs of the fixtures that received the message have been appended.

Figure 1:
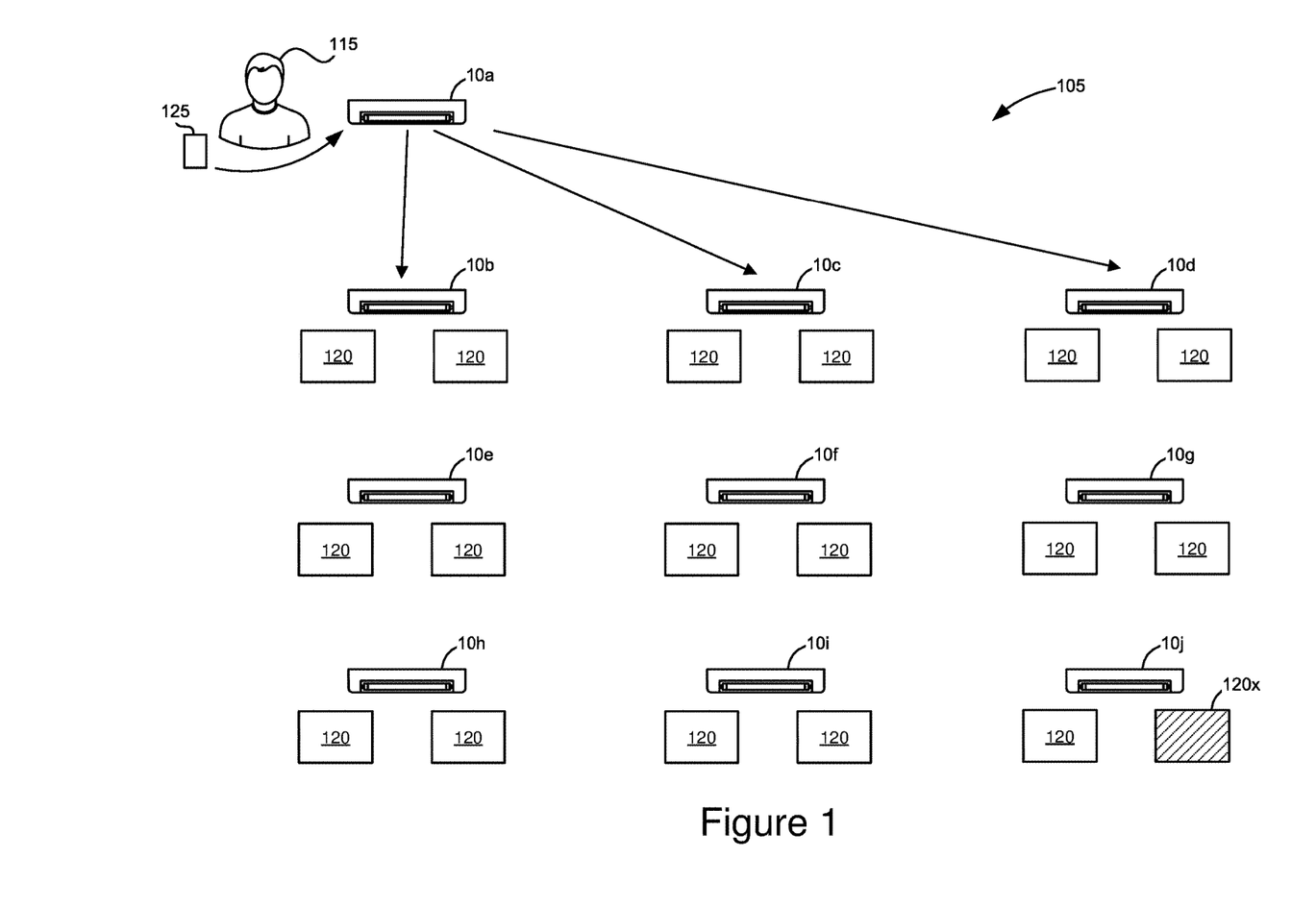
FIG. 1 is an example environment where multiple lighting fixtures are installed.

FIG. 1 shows an example environment 105 where multiple lighting fixtures 10a-10j are installed. Hereinafter, any one of lighting fixtures 10a-10j may be referred to as lighting fixture 10. Lighting fixtures 10 form a network of sensors that are able to communicate with each other to locate an asset 120x among a plurality of assets 120 in environment 105. For illustrative purposes, FIG. 1 shows a parking system where asset 120x to be located is a vehicle, and the environment 105 is a parking lot. A user 115 may utilize a device 125, such as a mobile phone or a remote keyless system (RKS), to transmit information about asset 120x to a nearby lighting fixture 10a that can be used by the system to locate asset 120x. FIG. 1 will be used to demonstrate the features of the present invention in conjunction with the steps as will be discussed in greater detail below. Other assets and environments such as, for example, imaging devices or computers in a building, asset inventory in a warehouse, and the like may also be tracked and located using the methods and system disclosed herein.

Figure 2:
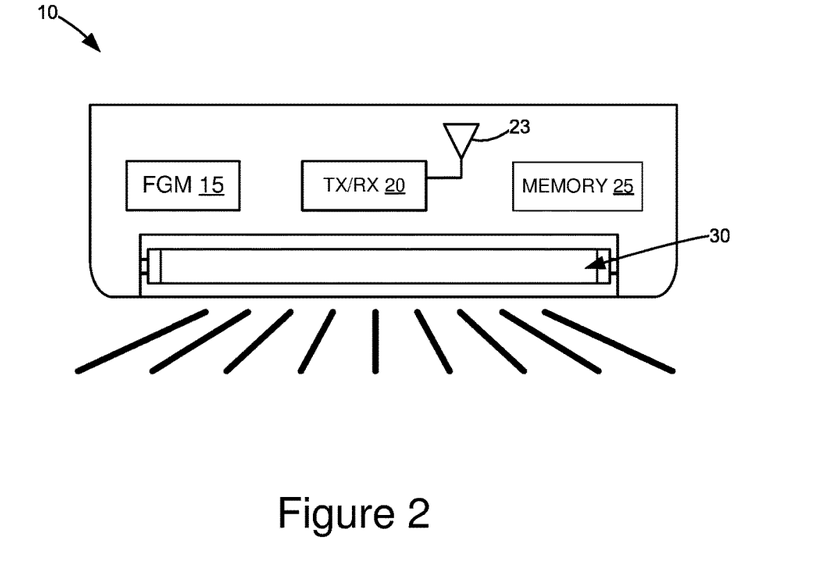
FIG. 2 shows an example embodiment of a lighting fixture.

With reference to FIG. 2, an example embodiment of lighting fixture 10 is shown. Lighting fixture 10 may be a wireless sensor network (WSN)-enabled lighting fixture. In the example shown, lighting fixture 10 includes a frequency gateway module (FGM) 15, a wireless sensor network (WSN) transceiver module (TX/RX) 20, a memory 25, and a lamp 30. FGM 15, transceiver module 20, and memory 25 may derive power from a power source (not shown) of lamp 30.

Transceiver module 20 may include at least one antenna 23 and a circuit that is configurable to operate as a transmitter and a receiver. Transceiver module 20 generally uses antenna 23 to transmit and receive radio frequency signals to and from device 125 and other lighting fixtures 10. In one example embodiment, transceiver module 20 may operate at multiple frequencies to communicate with device 125 and other lighting fixtures 10. For example, antenna 23 may be tuned to a first frequency, such as for example 315 MHz, to communicate with device 125 and assets 120, and to a second frequency, such as for example 2.4 GHz ISM band, to enable lighting fixture 10 to communicate data to one or more other lighting fixtures 10 in the network of lighting fixtures installed in environment 105. In this example embodiment, the second frequency is higher than the first frequency. Antenna may be implemented with one or more antennae.

FGM 15 decodes and/or demodulates information signals received by transceiver module 20, and encodes and/or modulates information signals for transmission by transceiver module 20. For example, FGM 15 receives data from device 125 that broadcasts information associated with an asset 120 at the first frequency, and encodes the data received from device 125 at the first frequency to a format suitable for transmission by transceiver module 20 over the network of lighting fixtures 10 at the second frequency. Conversely, FGM 15 also receives data from other lighting fixtures 10 that broadcasts information at the second frequency, and encodes the data received from other lighting fixtures 10 at the second frequency to a format suitable for transmission by transmission module 20 to device 125 or assets 120 at the first frequency.

Each lighting fixture 10 in the network of lighting fixtures installed in the environment 105 may include memory 25 that contains a unique identifier (ID) of the lighting fixture. In one example embodiment, FGM 15 is configured to append the ID of lighting fixture 10 in the encoded data. Upon encoding the data, FGM 15 sends the encoded data to transceiver module 20. Transceiver module 20 broadcasts the encoded data to one or more lighting fixtures in the environment in order to locate the asset specified in the information received by FGM 15 at the first frequency. Transceiver module 20 may broadcast the encoded data at the second frequency.

Figure 3:
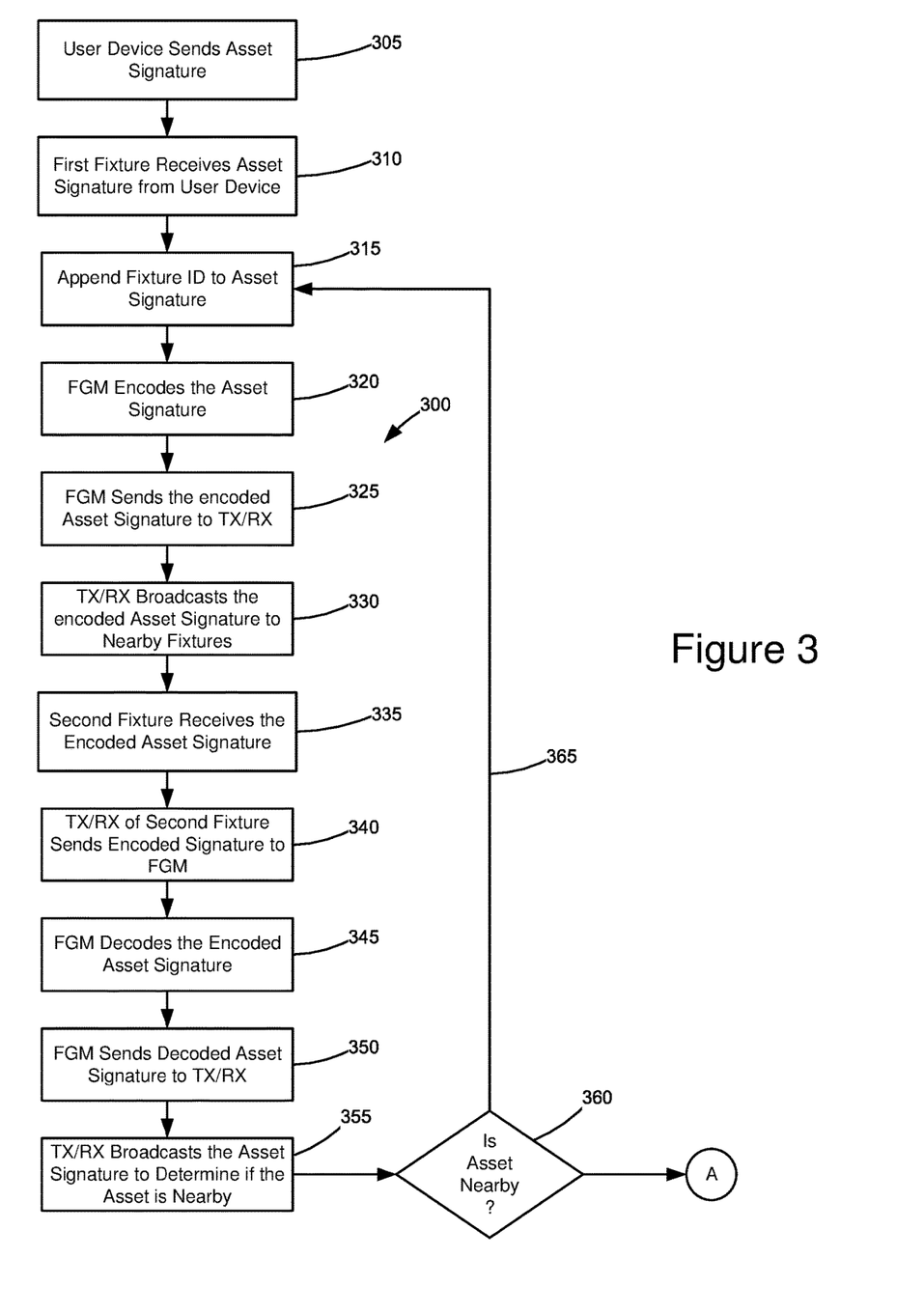
FIG. 3 shows an example method of searching for or locating an asset in the environment.
Figure 4:
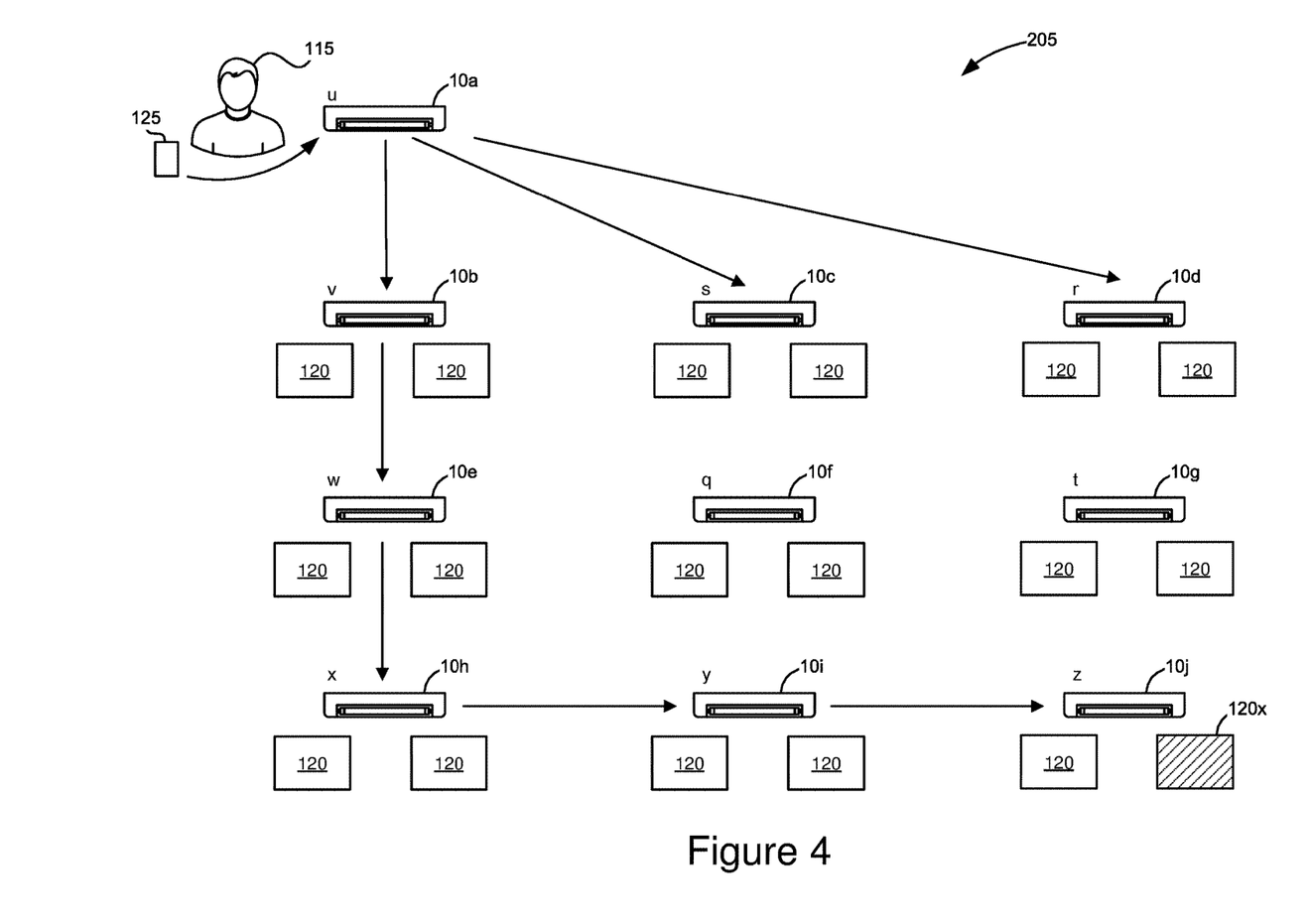
FIG. 4 is an example diagram showing a flow of communication between lighting fixtures in accordance with events of the example method in FIG. 3.

FIGS. 3 and 4 illustrate one example embodiment of enabling a user to search for or locate an asset using the network of lighting fixtures 10. FIG. 3 shows an example method 300 of searching for or locating an asset in environment 105. FIG. 4 is an example diagram showing a flow of communication between lighting fixtures 10 in accordance with events of example method 300.

At step 305, user 115 sends identifier information or an asset signature associated with asset 120x to be tracked to a nearest lighting fixture 10a through device 125. An asset signature may be a coded signal that is transmitted using wireless communication, such as by using electromagnetic waves, to a transceiver unit in the asset 120x. Other means for transmitting the coded signal may be performed using other standard communication protocols such as, for example, NFC, Bluetooth, and IEEE 802.xx. The coded signal may include a distinct digital identity code of asset 120x that can be used to communicate with asset 120x such as, for example, using the coded signal to lock or unlock a door in the car when the asset is a vehicle. If the coded signal is addressed to a particular asset, the asset may send a response signal to the device that sent the coded signal to the asset, indicating that the asset is within range of the device. For illustrative purposes, the asset signature of asset 120x sent from device 125 to nearest fixture 10a may be "abcde12345".

In this example embodiment, the asset signature is transmitted by device 125 at the first frequency and the asset is expected to communicate back to device 125 at the first frequency by sending an acknowledgement response back to device 125 if the asset 120x is within a certain range from device 125. For illustrative purposes, asset 120x is out of the specified range and cannot communicate directly with device 125.

At step 310, lighting fixture 10a receives the asset signature at the first frequency. Upon receiving the asset signature, fixture 10a may append its own ID to the asset signature (at step 315), indicating that the asset signature has been received by fixture 10a. In FIG. 4, each of lighting fixtures 10a-10j is shown having a unique ID, namely, u, v, s, r, w, q, t, x, y, z, respectively. For reference purposes, the asset signature that is appended with fixture ID is referred to herein as a message. For example, the message may be "abcde12345_u", where "u" is the ID of fixture 10a.

At step 320, FGM 15 of fixture 10a may encode the message to a format suitable for transmission over the network of lighting fixtures and send the message to transceiver module 20 (at step 325). At step 330, transceiver module 20 broadcasts the encoded message at the second frequency which is the frequency with which lighting fixtures 10 communicate messages with each other.

At step 335, a lighting fixture in proximity to lighting fixture 10a (such as, for example, fixture 10b), may receive the encoded message broadcasted by transceiver module 20 of fixture 10a. An event wherein a lighting fixture receives a message from another lighting fixture may be referred to herein as a "hop." When the hop occurs at step 335, succeeding steps 340-360 will be performed by one or more components of the receiving lighting fixture which, in this case, is lighting fixture 10b.

In this example embodiment, the transceiver module 20 of fixture 10b receives the message transmitted by the transceiver module 20 of fixture 10a at the second frequency. Upon receiving the encoded message, transceiver module 20 of fixture 10b may send the encoded message to FGM 15 of fixture 10b (at step 340).

At step 345, FGM 15 of fixture 10b may decode the encoded message and convert the message into a format suitable for communication with asset 120x. For example, FGM 15 may convert the message back into its original format corresponding to the coded signal including the asset signature transmitted by device 125 at step 305. At step 350, FGM 15 sends the message to transceiver module 20 of fixture 10b (at step 350). At step 355, transceiver module 20 of fixture 10b then broadcasts the coded signal including the asset signature at the first frequency. Decoding the message allows transceiver module 20 to broadcast the coded signal at the first frequency and communicate with one or more assets 220 nearby. By broadcasting the coded signal, transceiver module 20 polls or sends a query message to nearby assets to determine if asset 120x is within range. In this example embodiment, asset 120x communicates at the first frequency and is able to return an acknowledgment response to transceiver module 20 in response to the query message if the addressed asset 120x is within range from fixture 10b.

At step 360, it is determined if asset 120x is within range from fixture 10b and has returned an acknowledgement response to fixture 10b in response to the coded signal broadcasted by transceiver 20. If no acknowledgement response is received by transceiver module 20 of fixture 10b, fixture 10b prepares to make another hop in search of asset 120x (at step 365). The process then loops back to step 315.

In preparation for another hop, FGM 15 of fixture 10b appends the ID of fixture 10b to the message. For example, the message received by fixture 10b from fixture 10a is "abcde12345_u", where "abcde12345" is the asset signature and "u" is the ID of fixture 10a. ID of fixture 10b is appended to the message thereby forming "abcde12345_uv" wherein "v" is the ID of fixture 10b. Fixture 10b then encodes the message "abcde12345_uv" and sends the encoded message to transceiver module 20 of fixture 10b for broadcasting to nearby fixtures at the second frequency.

When a nearby fixture receives the message from fixture 10b, another hop occurs and steps 340-360 may be performed until the asset is nearby a broadcasting fixture and responds with an acknowledgement at the first frequency. For every hop, the message is appended with the ID of the fixture that received the message from the preceding fixture. Appending the ID of each fixture that receives the message indicates the fixtures that received, processed, and broadcasted the message until the asset has been located.

In FIG. 4, an example path of the message that has been passed on from the user device 125 to lighting fixture 10a, lighting fixture 10b, lighting fixture 10e, lighting fixture 10h, lighting fixture 10i, and so forth until the message reaches the asset is shown. When the asset does not respond with an acknowledgement message to a lighting fixture, indicating that the fixture is not nearby the asset, the ID of each fixture that received and passed the message is appended to the message such that an example message received and broadcasted by lighting fixture 10i is "abcde12345_uvwx". Message "abcde12345_uvwx" shows that the message has been passed from fixture 10a, fixture 10b, fixture 10e, and fixture 10h. Since fixture 10i does not receive an acknowledgement from asset 120x, it appends its ID (e.g., "y") to the message and sends the message "abcde12345_uvwxy" to nearby fixture 10j. In this example, the message "abcde12345_uvwxy" received and broadcasted by lighting fixture 10j is the first query message that reached asset 120x.

In continued reference to step 360, if the asset is nearby the last fixture that broadcasted the message (such as, for example, lighting fixture 10j), fixture 10j receives an acknowledgement response from asset 120x indicating that the asset has been located.

Figure 5:
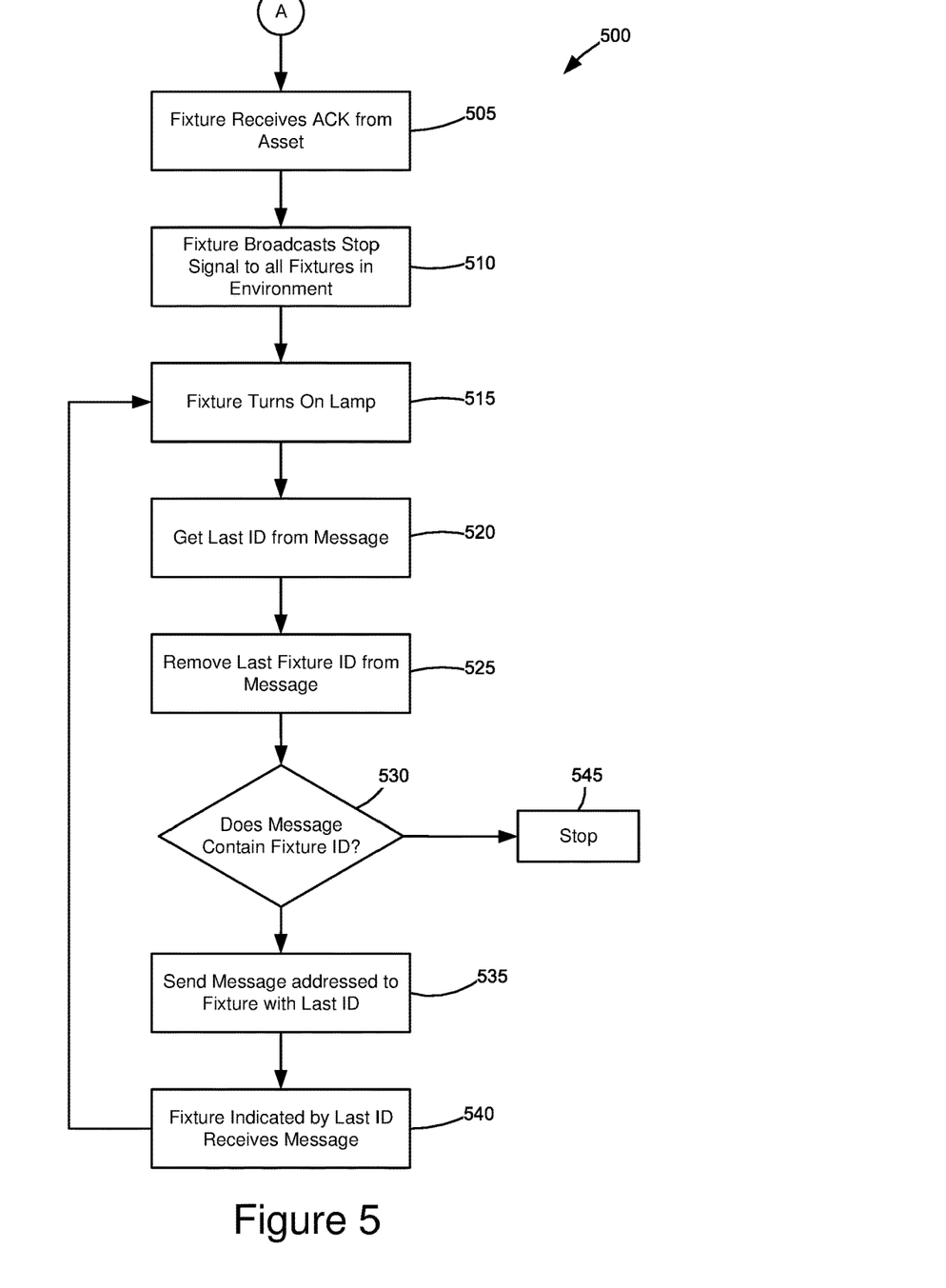
FIG. 5 shows an example method of forming a path from a user or a source device to an asset being located by the user using one or more lighting fixtures installed in the environment.

FIG. 5 shows an example method 500 of forming a path from the user (or a source device) to an asset being located by the user using one or more lighting fixtures installed in the environment. The method will be discussed in conjunction with the example set up shown in FIGS. 2, 4 and 6.

In response to the message broadcasted by fixture 10j (e.g., "abcde12345_uvwxy"), asset 120x sends an acknowledgement message to fixture 10j. At step 505, fixture 10j may receive the acknowledgement response from asset 120x. In one example embodiment, fixture 10j may be the first fixture that receives the acknowledgement response from asset 120x.

Fixture 10j then broadcasts a stop message or interrupt request line (IRQ) to the other fixtures installed in the environment (at step 510). The stop message and/or IRQ signals the other fixtures in the environment to cease the locating of the asset using the steps discussed in FIG. 3.

Fixture 10*j* then turns on its lamp at step 515. FGM 15 of fixture 10*j* reads the message received by fixture 10*j* and retrieves the last ID indicated in the message (at step 520). For example, the message received by fixture 10*j* is "abcde12345_uvwxy", and FGM 15 retrieves the last ID indicated in the message which, in this example, is "y".

At step 525, FGM 15 of fixture 10*j* removes the last ID from the message and FGM 15 checks if the message contains at least one fixture ID (at step 530). Transceiver module 20 of fixture 10*j* then sends the message to the fixture indicated in the last ID, the message transmitted at the second frequency (step 535). For example, at fixture 10*j*, the last ID is "y", and the message with the last ID removed is "abcde12345_uvwx." Since there is at least one fixture ID in the message "abcde12345_uvwx", fixture 10*j* sends the message "abcde12345_uvwx" to the fixture with ID="y" which in this example is fixture 10*i*.

At step 540, the fixture associated with the last ID receives the message and commands its lamp to turn on. For example, fixture 10*i* receives the message "abcde12345_uvwx" from fixture 10*j*, and fixture 10*i* turns on its respective lamp. In this example embodiment, the lamps of fixtures 10*j* and 10*i* are turned on. Fixture 10*i* then proceeds to perform steps 520-535 and sends the message to fixture 10*h* with ID "x," which turns on its lamp and performs the corresponding steps indicated in steps 520-535.

The fixtures with IDs indicated in the message "abcde12345_uvwxy" performs the steps until ID "u" is removed from the message and the message no longer contains any fixture IDs. When the message no longer contains any fixture ID, the method terminates (at step 545). As a result of the steps performed by the fixtures indicated in the message, one or more lamps are turned on thereby forming an illuminated path that leads a user or a source device from the user's location to the asset.

Figure 6:
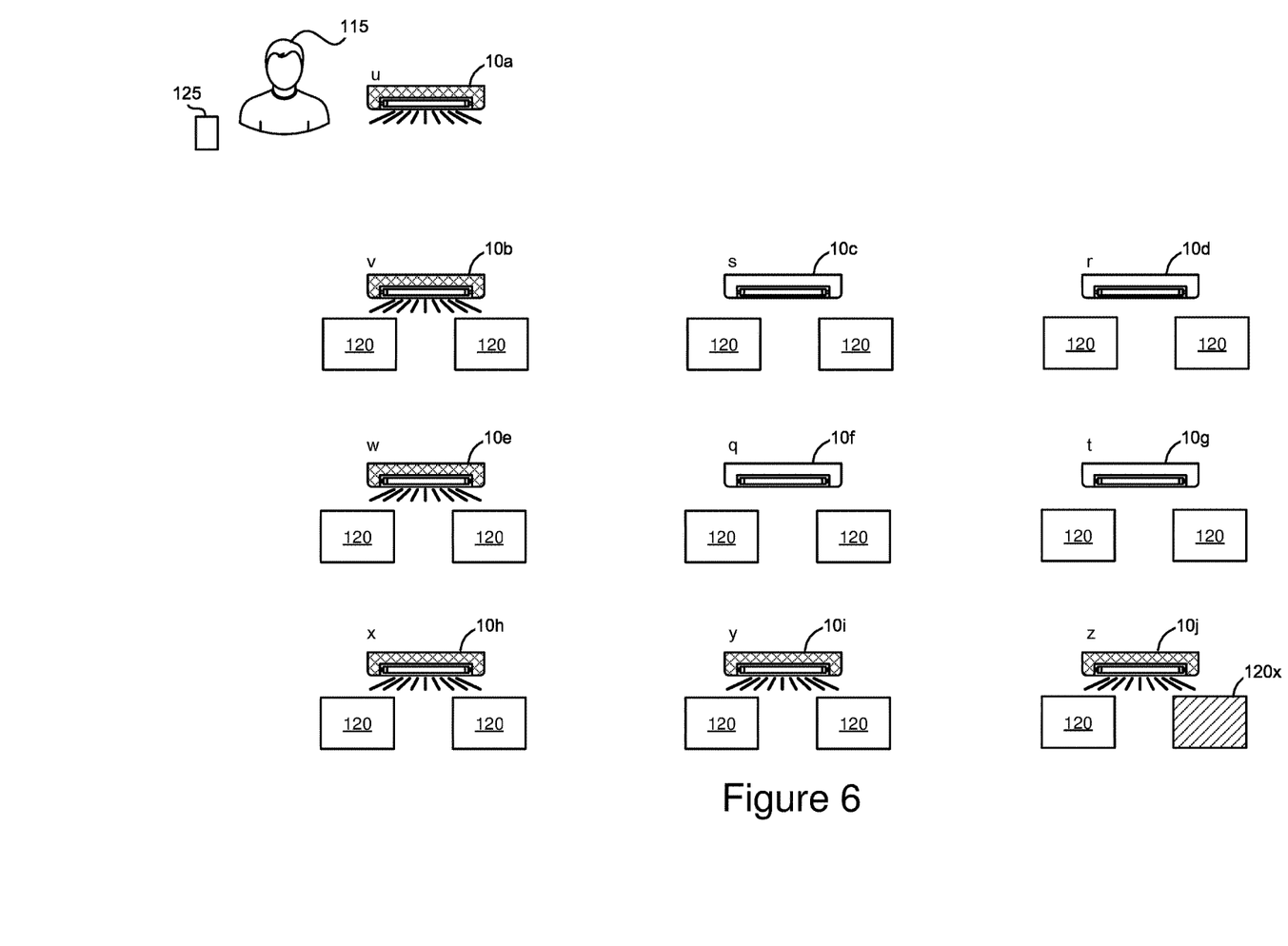
FIG. 6 shows an example environment where the lighting fixtures are illuminated, thereby forming a path of light from the user to the asset.

FIG. 6 shows an example environment where the fixtures are illuminated, thereby forming a path from the user to the asset 120*x*. User 115 may use the illuminated path to locate asset 120*x*. Fixtures 10*a*, 10*b*, 10*e*, 10*h*, 10*i* and 10*j* with lamps turned on to form the illuminated path may turn off their corresponding lamps when a timeout expires. In an alternative example embodiment, upon reaching the asset, the user may send a confirmation signal to at least one of the lighted fixtures via device 125 or asset 120*x* indicating that the asset has been found. The confirmation signal may be communicated by the lighted fixtures to each other at the second frequency and in response to receiving the confirmation signal, each lighted fixture may turn off its respective lamp.

It will be understood that the example applications described herein are illustrative and should not be considered limiting. It will be appreciated that the actions described and shown in the example flowcharts may be carried out or performed in any suitable order. It will also be appreciated that not all of the actions described in FIGS. 3 and 5 need to be performed in accordance with the example embodiments of the disclosure and/or additional actions may be performed in accordance with other example embodiments of the disclosure.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. A system for locating an asset in an environment, comprising:
    a plurality of lighting fixtures forming a network of sensors within the environment for detecting assets in the environment, each lighting fixture includes a transceiver for receiving from an external device identifier information associated with the asset to be tracked and for receiving an acknowledgement from the asset when the asset responds to a query message from the lighting fixture, the identifier information is communicated over the network from one lightning fixture to another until a last lighting fixture receives the acknowledgement from the asset;
    wherein a first lighting fixture that first receives the identifier information from the external device to the last lighting fixture that received the acknowledgement from the asset are illuminated such that a path of light is formed from a location of the external device to the asset, and further wherein each lighting fixture communicates with the external device and the assets in the environment at a first frequency and the lighting fixtures communicate with each other at a second frequency different from the first frequency.

2. The system of claim 1, wherein the plurality of lighting fixtures form a wireless sensor network.

3. The system of claim 1, wherein each lighting fixture broadcasts the query message to assets within range of the lighting fixture in response to receiving the identifier information.

4. The system of claim 1, wherein the query message has the same format as a format in which the external device provides the identifier information.

5. The system of claim 1, wherein the last lighting fixture broadcasts a stop message to the network in response to receiving the acknowledgement from the asset, the stop message indicating that the last lighting fixture has detected the asset.

6. The system of claim 1, wherein each lighting fixture includes a gateway module that encodes the identifier information received from the external device into a format suitable for transmission between the lighting fixtures.

7. The system of claim 1, wherein each lighting fixture includes a gateway module that encodes the identifier information received from another lighting fixture into a format suitable for transmission to the assets in the environment.

8. A localization system for determining location of an asset, comprising:
    a user device for providing identifier information associated with the asset to be tracked; and
    a plurality of lighting fixtures distributed within an environment to form a network of sensors for detecting the presence of assets in the environment, each lighting fixture is operative to communicate with the user device and the assets at a first frequency, and the lighting fixtures are operative to communicate with each other at a second frequency;
    wherein, in response to the user device providing the identifier information at the first frequency, the plurality of lighting fixtures communicate the identifier information over the network at the second frequency from a first lighting fixture that first receives the identifier information from the user device to a last lighting fixture that detects the presence of the asset to be tracked, the first lighting fixture to the last lighting fixture are illuminated to form a path of light from a location of the user device to the asset.

9. The localization system of claim 8, wherein the plurality of lighting fixtures form a wireless sensor network.

10. The localization system of claim 8, wherein each lighting fixture broadcasts a query message to assets within range of the lighting fixture in response to receiving the identifier information.

11. The localization system of claim 10, wherein the query message has the same format as a format in which the user device provides the identifier information.

12. The localization system of claim 10, wherein the last lighting fixture detects the presence of the asset to be tracked when the last lighting fixture receives an acknowledgement from the asset in response to the query message by the last lighting fixture.

13. The localization system of claim 12, wherein the last lighting fixture broadcasts a stop message to the network in response to receiving the acknowledgement from the asset, the stop message indicating that the last lighting fixture has detected the asset to be tracked.

14. The localization system of claim 8, wherein each lighting fixture includes a gateway module that encodes the identifier information received from the user device into a format suitable for transmission between the lighting fixtures.

15. The localization system of claim 8, wherein each lighting fixture includes a gateway module that encodes the identifier information received from another lighting fixture into a format suitable for transmission to the assets in the environment.

16. In a location system including a plurality of lighting fixtures forming a network of sensors in an environment for detecting assets in the environment, a method for determining a location of an asset in the environment, comprising;
   receiving, at a first lighting fixture of the plurality of lighting fixtures, identifier information associated with the asset to be tracked from a user device, wherein the identifier information is received at a first frequency;
   communicating, by the first lighting fixture, the identifier information over the network at a second frequency different from the first frequency, each lighting fixture that receives the identifier information uses the identifier information to detect whether the asset is within range of the lighting fixture at the first frequency, the identifier information is passed from one lighting fixture to another until a last lighting fixture receives an acknowledgement from the asset; and
   illuminating the lighting fixtures that received the identifier information from the first lighting fixture to the last lighting fixture to form a path of light from a location of the user device to the asset.

17. The method of claim 16, further comprising encoding, by each lighting fixture receiving the identifier information, the identifier information into a format suitable for transmission between the lighting fixtures.

18. The method of claim 16, further comprising generating, by each lighting fixture, a query message based on the identifier information and broadcasting the query message to one or more assets within range of the lighting fixture in response to receiving the identifier information.

19. The method of claim 18, further comprising receiving, by the last lighting fixture, an acknowledgement from the asset in response to the query message by the last lighting fixture, the acknowledgement indicating that the last lighting fixture has detected the asset to be tracked.

* * * * *